(12) United States Patent  
He et al.

(10) Patent No.: US 12,395,273 B2
(45) Date of Patent: Aug. 19, 2025

(54) METHOD FOR RETRANSMITTING DATA AND APPARATUS

(71) Applicant: Huawei Technologies Co., Ltd., Shenzhen (CN)

(72) Inventors: Tao He, Shenzhen (CN); Donghao Yu, Shenzhen (CN); Kejia Lan, Shenzhen (CN); Ying Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 288 days.

(21) Appl. No.: 18/147,344

(22) Filed: Dec. 28, 2022

(65) Prior Publication Data

US 2023/0261795 A1 Aug. 17, 2023

Related U.S. Application Data

(63) Continuation of application No. PCT/CN2020/099035, filed on Jun. 29, 2020.

(51) Int. Cl.
*H04L 1/1607* (2023.01)

(52) U.S. Cl.
CPC .................................. *H04L 1/1628* (2013.01)

(58) Field of Classification Search
CPC ... H04L 1/1628; H04L 1/1635; H04L 1/1621; H04L 1/16; H04L 1/14; H04L 1/1867; H04L 1/1874; H04L 1/1887; H04L 1/1848; H04L 1/0061
See application file for complete search history.

(56) References Cited

U.S. PATENT DOCUMENTS

| | | | |
|---|---|---|---|
| 7,991,875 B2 | 8/2011 | Chou et al. | |
| 2015/0163170 A1 | 6/2015 | Birrittella | |
| 2016/0085619 A1 | 3/2016 | Iyer et al. | |
| 2017/0012742 A1* | 1/2017 | Zhu | H04L 1/1614 |
| 2018/0241506 A1 | 8/2018 | Kohda et al. | |
| 2019/0215107 A1* | 7/2019 | Lida | H04L 1/0007 |
| 2019/0364574 A1 | 11/2019 | Ma et al. | |
| 2020/0012555 A1 | 1/2020 | Das Sharma | |
| 2020/0177316 A1 | 6/2020 | Tang | |
| 2022/0086098 A1* | 3/2022 | Huang | H04L 45/245 |
| 2022/0329519 A1* | 10/2022 | Wang | H04L 1/1628 |

(Continued)

FOREIGN PATENT DOCUMENTS

| | | |
|---|---|---|
| CN | 101753388 A | 6/2010 |
| CN | 102981804 A | 3/2013 |

(Continued)

OTHER PUBLICATIONS

Sun Meidongm, et al:, "Adaptive unicast routing algorithm for vertically partially connected 3D NoC," Journal of Computer Applications, ISSN 1001-9081( 2018) 05-1470-06, Dec. 26, 2017, with English translation, 30 pages.

*Primary Examiner* — Phong La
(74) *Attorney, Agent, or Firm* — Conley Rose, P.C.

(57) ABSTRACT

A method for retransmitting data includes a transmitter receiving a retry request, where the retry request includes a sequence number of a first to-be-retransmitted flit. The transmitter reads data in a retry buffer based on the sequence number of the first to-be-retransmitted flit and retransmits the data, where the retry buffer includes flits of at least two types of data packets, and retransmission manners of the at least two types of data packets are different.

20 Claims, 7 Drawing Sheets

(56) References Cited

U.S. PATENT DOCUMENTS

| | | | | |
|---|---|---|---|---|
| 2023/0139754 A1* | 5/2023 | Zhu | ............................ | H04L 1/18 |
| | | | | 370/328 |
| 2023/0147131 A1* | 5/2023 | Zhou | ...................... | H04L 5/0044 |
| | | | | 370/329 |
| 2023/0261795 A1* | 8/2023 | He | ......................... | H04L 1/1874 |
| | | | | 370/464 |
| 2023/0327812 A1* | 10/2023 | Cohen | ................... | H04L 1/1642 |
| | | | | 714/748 |

FOREIGN PATENT DOCUMENTS

| | | | | | |
|---|---|---|---|---|---|
| CN | 106487673 | A | | 3/2017 | |
| CN | 107682118 | A | | 2/2018 | |
| CN | 108401291 | A | | 8/2018 | |
| CN | 110431872 | A | | 11/2019 | |
| CN | 112636880 | A | * | 4/2021 | ......... H04B 7/18513 |
| CN | 113037440 | A | * | 6/2021 | ........... H04L 1/1825 |
| CN | 114157401 | A | * | 3/2022 | ........... H04L 1/1835 |
| CN | 114610653 | A | * | 6/2022 | |
| CN | 110431872 | B | | 10/2022 | |
| WO | WO-2013152586 | A1 | * | 10/2013 | ........... H04L 1/1887 |
| WO | WO-2018127020 | A1 | * | 7/2018 | ............... H04L 1/16 |

\* cited by examiner

FIG. 4

Sent data packet    Retry buffer

METHOD FOR RETRANSMITTING DATA AND APPARATUS

CROSS-REFERENCE TO RELATED APPLICATIONS

This is a continuation of International Patent Application No. PCT/CN2020/099035 filed on Jun. 29, 2020, the disclosure of which is hereby incorporated by reference in its entirety.

TECHNICAL FIELD

This disclosure relates to the field of terminal software, and in particular, to a method for retransmitting data and an apparatus.

BACKGROUND

In a data transmission process at a link layer, if a data transmission error occurs, corresponding data may be retransmitted.

Currently, the link layer includes the following several retransmission mechanisms: 1. As shown in A in FIG. 1, retransmission is performed based on a micropacket/flit (flit). A transmitter (TX) sends flits (for example, a flit 0, a flit 1, and a flit 2) to a receiver(RX). If the receiver determines a cyclic redundancy check (CRC) error of the flit 1, the receiver sends a link layer retry (LLR) request to the transmitter. After receiving the LLR request, the transmitter sends an LLR response to the receiver, and retransmits the flit 1 and flits after the flit 1 (for example, a flit 2). Protocols such as a Quick Path Interconnect (QPI) protocol, an Ultra Path Interconnect (UPI) protocol, and a Huawei cache coherence specification (HCCS) 1.0 can support this retransmission mechanism. 2. As shown in B in FIG. 1, retransmission is performed based on a data packet/packet (pkt), the transmitter sends a data packet to the receiver, where the data packet includes flits such as a head, data 0, data 1, and a tail. If the receiver determines a CRC check error (CRC err) of the tail, the receiver sends an LLR request to the transmitter. After receiving the LLR request, the transmitter sends an LLR response to the receiver, and retransmits the data packet. Protocols such as a Peripheral Component Interconnect Express (PCIe) protocol, a Computer Express Link (Cxl) protocol, and HCCS2.0 support this retransmission mechanism. 3. Retransmission is not performed. As shown in C in FIG. 1, the transmitter sends data packets (for example, a pkt 0 and a pkt 1) to the receiver. If the receiver determines a CRC check error of the pkt 0, the receiver redetermines a correct packet header. Before the correct message header is found, all received data packets (for example, the pkt 1 to a pkt n) are discarded. Protocols such as an InfiniBand (IB) protocol and an Ethernet protocol can support this mechanism in which retransmission is not performed.

In FIG. 1, the three retransmission mechanisms A, B, and C have different definitions of a data type (data format) of a data packet at the link layer. A data packet of one data type corresponds to one retransmission mechanism. If data packets of a plurality of data types exist at the link layer at the same time, how to retransmit the data packets is an urgent problem to be resolved.

SUMMARY

Embodiments of this disclosure provide a method for retransmitting data and an apparatus, to retransmit data packets of a plurality of data types.

According to a first aspect, an embodiment of this disclosure provides a method for retransmitting data. The method includes: A transmitter receives a retry request, where the retry request includes a sequence number of a first to-be-retransmitted flit; and the transmitter reads data in a retry buffer based on the sequence number of the first to-be-retransmitted flit and retransmits the data, where the retry buffer includes flits of at least two types of data packets, and retransmission manners of the at least two types of data packets are different.

Based on the method provided in this embodiment of this disclosure, after receiving the retry request, the transmitter may read the data in the retry buffer based on the sequence number of the first to-be-retransmitted flit carried in the retry request and retransmit the data. The retry buffer includes the flits of the at least two types of data packets, and the retransmission manners of the at least two types of data packets are different. In this way, when a link layer includes at least two types of data packets, the at least two types of data packets may share a retry buffer, and corresponding data may be retransmitted in different retransmission manners, that is, a function of supporting a plurality of retransmission mechanisms (retransmission manners) at the link layer can be implemented. Therefore, data packets of different data types at the link layer can be retransmitted.

In a possible implementation, the at least two types of data packets include at least two of a first type of data packet, a second type of data packet, and a third type of data packet. A retransmission manner of the first type of data packet is that the first type of data packet is retransmitted by using a flit as a granularity, a retransmission manner of the second type of data packet is that the second type of data packet is retransmitted by using a data packet as a granularity, and a retransmission manner of the third type of data packet is that the third type of data packet is not retransmitted.

In a possible implementation, the retry buffer includes all flits of the first type of data packet, all flits of the second type of data packet, and a head flit of the third type of data packet. Alternatively, the retry buffer includes all flits of the first type of data packet and all flits of the second type of data packet. Alternatively, the retry buffer includes all flits of the first type of data packet and a head flit of the third type of data packet. Alternatively, the retry buffer includes all flits of the second type of data packet and a head flit of the third type of data packet.

In a possible implementation, a head flit of each type of data packet in the at least two types carries indication information. The indication information is used to indicate a type of the data packet.

In a possible implementation, the method further includes: The transmitter sends a retransmission response. The retransmission response includes the sequence number of the first to-be-retransmitted flit and a sequence number of the last to-be-retransmitted flit.

In a possible implementation, if a flit that fails to be checked by the receiver is a flit of the first type of data packet, the first to-be-retransmitted flit is the flit that fails to be checked by the receiver. If a flit that fails to be checked by the receiver is a flit of the second type of data packet or a flit of the third type of data packet, the first to-be-retransmitted flit is a head flit of a data packet to which the flit that fails to be checked by the receiver belongs.

In a possible implementation, if the last flit sent by the transmitter before the transmitter receives the retransmission response is the flit of the first type of data packet, the last to-be-retransmitted flit is the last flit sent before the retransmission response; if the last flit sent by the transmitter before the transmitter receives the retransmission response is the flit of the second type of data packet, the last to-be-retransmitted flit is a tail flit of a data packet to which the last flit sent before the retransmission response belongs; or if the last flit sent by the transmitter before the transmitter receives the retransmission response is the flit of the third type of data packet, the last to-be-retransmitted flit is a head flit of a data packet to which the last flit sent before the retransmission response belongs.

According to a second aspect, an embodiment of this disclosure provides a method for retransmitting data. The method includes: A receiver sends a retry request, where the retry request includes a sequence number of a first to-be-retransmitted flit; and the receiver receives retransmission data, where the retransmission data includes flits of at least two types of data packets, and retransmission manners of the at least two types of data packets are different.

Based on the method provided in this embodiment of this disclosure, after sending the retry request, the receiver may receive the retransmission data retransmitted by a transmitter. The retransmission data includes the flits of the at least two types of data packets, and the retransmission manners of the at least two types of data packets are different. In this way, when a link layer includes the at least two types of data packets, the receiver may receive data retransmitted by the transmitter in different retransmission manners, that is, a function of supporting a plurality of retransmission mechanisms (retransmission manners) at the link layer may be implemented.

In a possible implementation, the at least two types of data packets include at least two of a first type of data packet, a second type of data packet, and a third type of data packet. A retransmission manner of the first type of data packet is that the first type of data packet is retransmitted by using a flit as a granularity, a retransmission manner of the second type of data packet is that the second type of data packet is retransmitted by using a data packet as a granularity, and a retransmission manner of the third type of data packet is that the third type of data packet is not retransmitted.

In a possible implementation, the method further includes: if the retransmission data includes a flit of the first type of data packet and/or a flit of the second type of data packet, buffering the flit of the first type of data packet and/or the flit of the second type of data packet; and if the retransmission data includes a head flit of the third type of data packet, discarding the head flit of the third type of data packet.

In a possible implementation, a head flit of each type of data packet in the at least two types carries indication information. The indication information is used to indicate a type of the data packet.

In a possible implementation, the method further includes: The receiver receives a retransmission response, where the retransmission response includes the sequence number of the first to-be-retransmitted flit and a sequence number of a last to-be-retransmitted flit.

In a possible implementation, if a flit that fails to be checked by the receiver is the flit of the first type of data packet, the first to-be-retransmitted flit is the flit that fails to be checked by the receiver; or if a flit that fails to be checked by the receiver is the flit of the second type of data packet or the flit of the third type of data packet, the first to-be-retransmitted flit is a head flit of a data packet to which the flit that fails to be checked by the receiver belongs.

In a possible implementation, if the last flit sent by the transmitter before the transmitter receives the retransmission response is the flit of the first type of data packet, the last to-be-retransmitted flit is the last flit sent before the retransmission response; if the last flit sent by the transmitter before the transmitter receives the retransmission response is the flit of the second type of data packet, the last to-be-retransmitted flit is a tail flit of a data packet to which the last flit sent before the retransmission response belongs; or if the last flit sent by the transmitter before the transmitter receives the retransmission response is the flit of the third type of data packet, the last to-be-retransmitted flit is a head flit of a data packet to which the last flit sent before the retransmission response belongs.

According to a third aspect, an embodiment of this disclosure provides a transmitter, including: a transceiver unit, configured to receive a retry request, where the retry request includes a sequence number of a first to-be-retransmitted flit; and a processing unit, configured to read data in a retry buffer based on the sequence number of the first to-be-retransmitted flit, and retransmit the data by using the transceiver unit, where the retry buffer includes flits of at least two types of data packets, and retransmission manners of the at least two types of data packets are different.

In a possible implementation, the at least two types of data packets include at least two of a first type of data packet, a second type of data packet, and a third type of data packet. A retransmission manner of the first type of data packet is that the first type of data packet is retransmitted by using a flit as a granularity, a retransmission manner of the second type of data packet is that the second type of data packet is retransmitted by using a data packet as a granularity, and a retransmission manner of the third type of data packet is that the third type of data packet is not retransmitted.

In a possible implementation, the retry buffer includes all flits of the first type of data packet, all flits of the second type of data packet, and a head flit of the third type of data packet. Alternatively, the retry buffer includes all flits of the first type of data packet and all flits of the second type of data packet. Alternatively, the retry buffer includes all flits of the first type of data packet and a head flit of the third type of data packet. Alternatively, the retry buffer includes all flits of the second type of data packet and a head flit of the third type of data packet.

In a possible implementation, a head flit of each type of data packet in the at least two types carries indication information. The indication information is used to indicate a type of the data packet.

In a possible implementation, the transceiver unit is further configured to send a retransmission response, where the retransmission response includes the sequence number of the first to-be-retransmitted flit and a sequence number of a last to-be-retransmitted flit.

In a possible implementation, if a flit that fails to be checked by the receiver is the flit of the first type of data packet, the first to-be-retransmitted flit is the flit that fails to be checked by the receiver; or if a flit that fails to be checked by the receiver is the flit of the second type of data packet or the flit of the third type of data packet, the first to-be-retransmitted flit is a head flit of a data packet to which the flit that fails to be checked by the receiver belongs.

In a possible implementation, if the last flit sent by the transmitter before the transmitter receives the retransmission response is the flit of the first type of data packet, the last to-be-retransmitted flit is the last flit sent before the retransmission response; if the last flit sent by the transmitter before the transmitter receives the retransmission response is the flit of the second type of data packet, the last to-be-retransmitted flit is a tail flit of a data packet to which the last flit sent before the retransmission response belongs; or if the last flit sent by the transmitter before the transmitter receives the retransmission response is the flit of the third type of data packet, the last to-be-retransmitted flit is a head flit of a data packet to which the last flit sent before the retransmission response belongs.

According to a fourth aspect, an embodiment of this disclosure provides a receiver, including a transceiver unit configured to send a retry request, where the retry request includes a sequence number of a first to-be-retransmitted flit. The transceiver unit is further configured to receive retransmission data, where the retransmission data includes flits of at least two types of data packets, and retransmission manners of the at least two types of data packets are different.

In a possible implementation, the at least two types of data packets include at least two of a first type of data packet, a second type of data packet, and a third type of data packet. A retransmission manner of the first type of data packet is that the first type of data packet is retransmitted by using a flit as a granularity, a retransmission manner of the second type of data packet is that the second type of data packet is retransmitted by using a data packet as a granularity, and a retransmission manner of the third type of data packet is that the third type of data packet is not retransmitted.

In a possible implementation, the receiver further includes a processing unit configured to: if the retransmission data includes a flit of the first type of data packet and/or a flit of the second type of data packet, buffer the flit of the first type of data packet and/or the flit of the second type of data packet; and if the retransmission data includes a head flit of the third type of data packet, discard the head flit of the third type of data packet.

In a possible implementation, a head flit of each type of data packet in the at least two types carries indication information. The indication information is used to indicate a type of the data packet.

In a possible implementation, the transceiver unit is further configured to receive a retransmission response, where the retransmission response includes the sequence number of the first to-be-retransmitted flit and a sequence number of a last to-be-retransmitted flit.

In a possible implementation, if a flit that fails to be checked by the receiver is the flit of the first type of data packet, the first to-be-retransmitted flit is the flit that fails to be checked by the receiver; or if a flit that fails to be checked by the receiver is the flit of the second type of data packet or the flit of the third type of data packet, the first to-be-retransmitted flit is a head flit of a data packet to which the flit that fails to be checked by the receiver belongs.

In a possible implementation, if the last flit sent by a transmitter before the transmitter receives the retransmission response is the flit of the first type of data packet, the last to-be-retransmitted flit is the last flit sent before the retransmission response; if the last flit sent by the transmitter before the transmitter receives the retransmission response is the flit of the second type of data packet, the last to-be-retransmitted flit is a tail flit of a data packet to which the last flit sent before the retransmission response belongs; or if the last flit sent by the transmitter before the transmitter receives the retransmission response is the flit of the third type of data packet, the last to-be-retransmitted flit is a head flit of a data packet to which the last flit sent before the retransmission response belongs.

According to a fifth aspect, an embodiment of this disclosure provides a computer-readable storage medium, including instructions, where when the instructions are run on a computer, the computer is enabled to perform any method provided in any one of the first aspect or the second aspect.

According to a sixth aspect, an embodiment of this disclosure provides a computer program product that includes instructions. When the computer program product runs on a computer, the computer is enabled to perform any method provided in any one of the first aspect or the second aspect.

According to a seventh aspect, an embodiment of this disclosure provides a chip system. The chip system includes a processor, and may further include a memory, to implement any method provided in any one of the first aspect or the second aspect. The chip system may include a chip, or include a chip and another discrete device.

According to an eighth aspect, an embodiment of this disclosure further provides an apparatus. The apparatus may be a transmitter. The apparatus includes a processor that is configured to implement any method provided in the first aspect. The apparatus may further include a memory that is configured to store program instructions and data. The memory may be a memory integrated in the apparatus, or may be an off-chip memory disposed outside the apparatus. The memory is coupled to the processor, and the processor may invoke and execute the program instructions stored in the memory, to implement any method provided in the first aspect. The apparatus may further include a communications interface. The communications interface is used by the apparatus to communicate with another device (a receiver).

According to a ninth aspect, an embodiment of this disclosure further provides an apparatus. The apparatus may be a receiver. The apparatus includes a processor that is configured to implement any method provided in the second aspect. The apparatus may further include a memory that is configured to store program instructions and data. The memory may be a memory integrated in the apparatus, or may be an off-chip memory disposed outside the apparatus. The memory is coupled to the processor, and the processor may invoke and execute the program instructions stored in the memory, to implement any method provided in the second aspect. The apparatus may further include a communications interface. The communications interface is used by the apparatus to communicate with another device (a transmitter).

According to a tenth aspect, an embodiment of this disclosure provides a system for retransmitting data, where the system includes the transmitter according to any implementation of the third aspect and the receiver according to any implementation of the fourth aspect.

BRIEF DESCRIPTION OF DRAWINGS

FIG. 4 is another schematic diagram of different types of data packets according to an embodiment of this disclosure.

DESCRIPTION OF EMBODIMENTS

For clearly and briefly describe the following embodiments, brief descriptions of concepts or technologies in the embodiments of this disclosure are described below.

Figure 1:
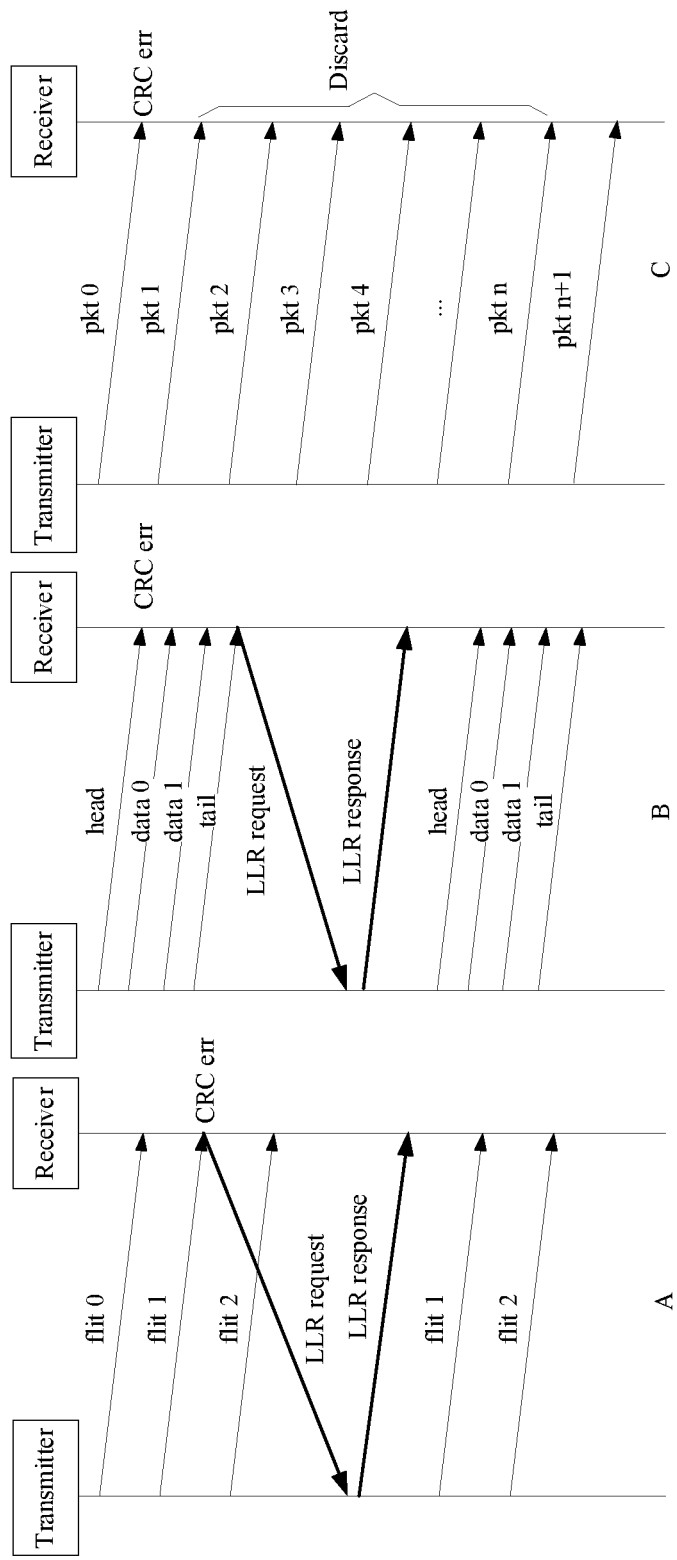
FIG. 1 is a schematic diagram of different retransmission mechanisms in other approaches.
Figure 2:
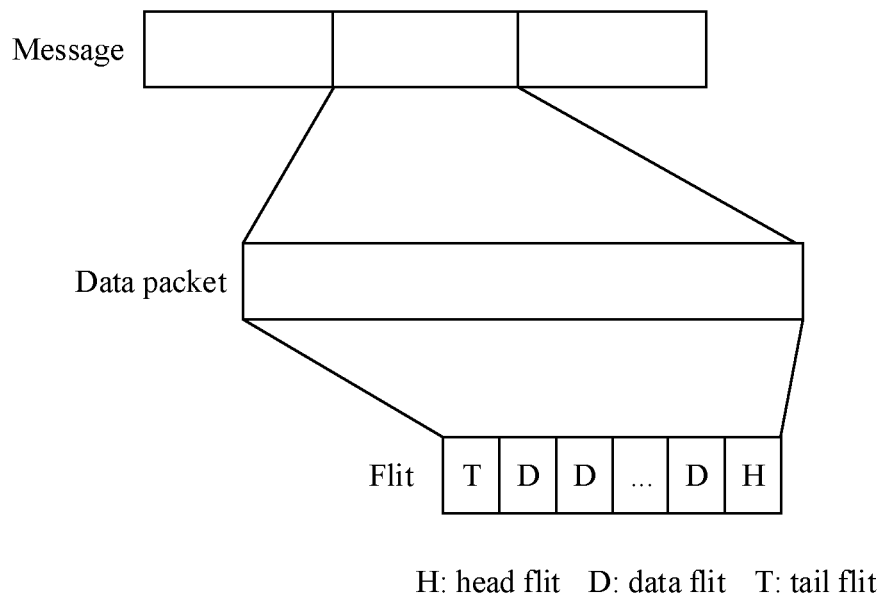
FIG. 2 is a schematic diagram of a data format according to an embodiment of this disclosure.

As shown in FIG. 2, a message/message is a logical unit for inter-node communication, and usually includes any quantity of data packets (which may also be referred to as packets for short), that is, a length of the message is variable, and a length of each data packet in the message may be fixed. It should be noted that a data packet in this embodiment of this disclosure is a data packet at a link layer (Link packet). The data packet may be divided into a plurality of flits. The flits may be classified into three types: a head flit (which may also be referred to as a head flit), a data flit (which may also be referred to as a data flit), and a tail flit (which may also be referred to as a tail flit). The head flit may carry information such as a source address, a destination address, and a length of the data packet. The tail flit represents a termination of the data packet. The data flit exists between the head flit and the tail flit, and carries data that needs to be transmitted. Certainly, the head flit and the tail flit may also carry some data. Each data packet includes a head flit and a tail flit, and may include zero data flits, one data flit, or a plurality of data flits.

Figure 3:
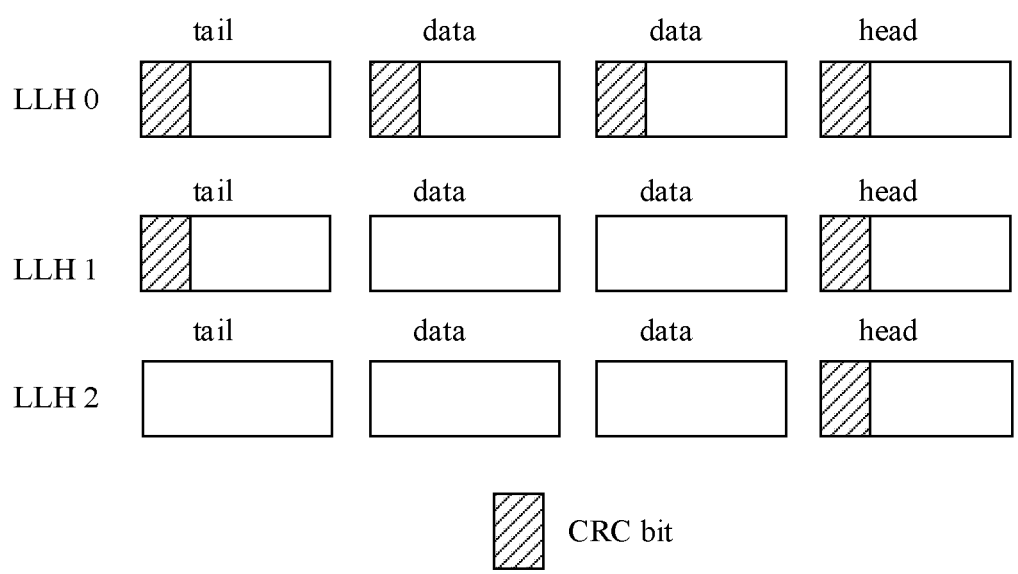
FIG. 3 is a schematic diagram of different types of data packets according to an embodiment of this disclosure.

In this embodiment of this disclosure, LLH 0, LLH 1, and LLH 2 respectively represent basic data packet types of three different retransmission mechanisms. As shown in FIG. 3, in a retransmission mechanism in which a flit is a retransmission unit (retransmission granularity), a type of a data packet may be LLH 0, where the LLH 0 may include a plurality of flits (four flits are used as an example in FIG. 3), and each flit carries a CRC. In a retransmission mechanism in which a pkt is a retransmission unit, a type of a data packet may be LLH 1, where the LLH 1 may include a plurality of flits (four flits are used as an example in FIG. 3), a head flit and a tail flit each carry a CRC, and a data flit may not carry a CRC. In a mechanism in which retransmission is not performed, a type of a data packet may be LLH 2, where the LLH 2 may include a plurality of flits (four flits are used as an example in FIG. 3), only the head flit carries a CRC, and the tail flit and the data flit may not carry a CRC. Certainly, in different retransmission mechanisms, another type of data packet may also exist. Different types of data packets may also have other naming manners. This is not limited in this disclosure.

Figure 4:
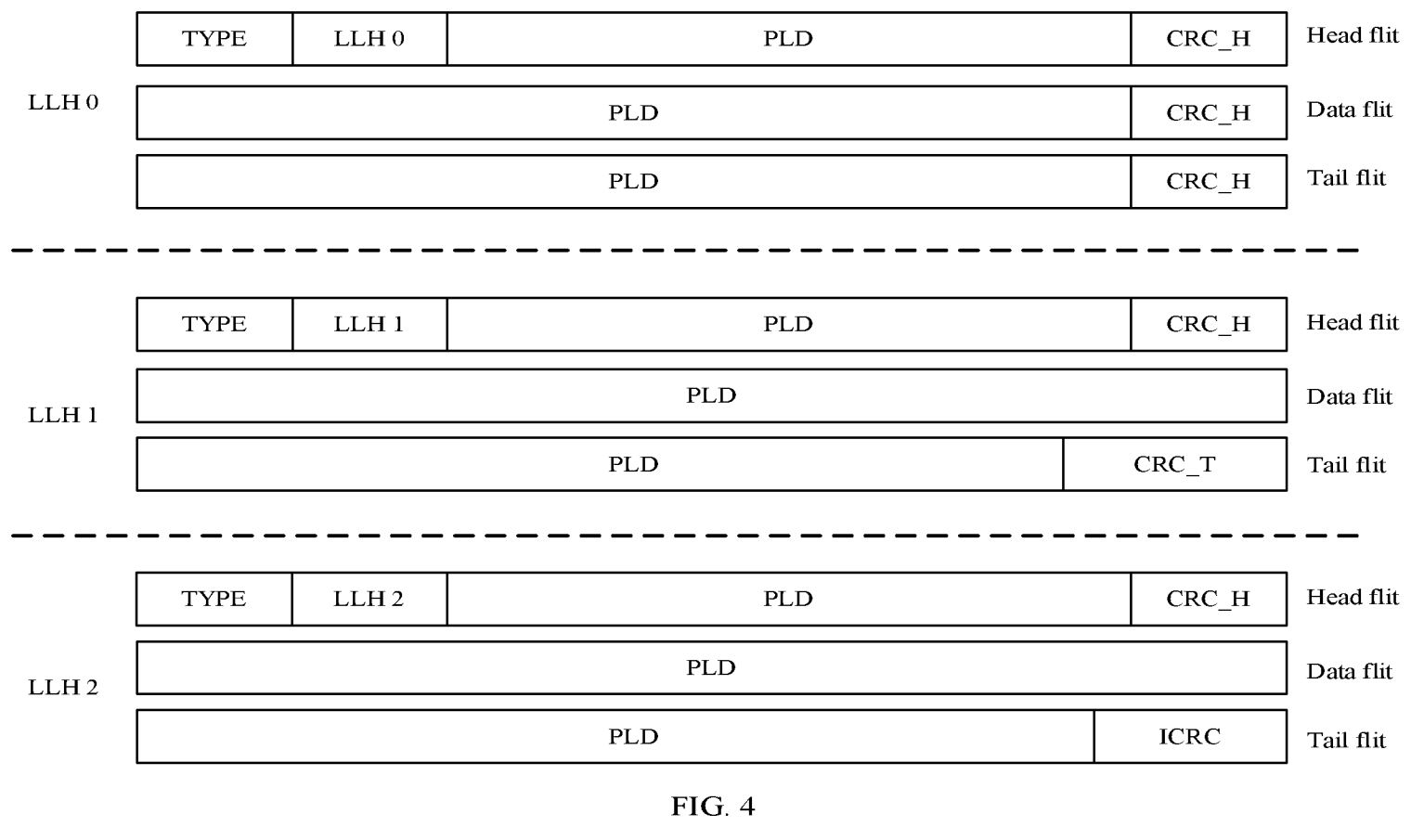

As shown in FIG. 4, head flits of data packets of the types LLH 0, LLH 1, and LLH 2 each may carry a TYPE. The TYPE is used to indicate that the data packet is a control data packet or a protocol data packet. The head flit may further carry type information of the data packet. For example, the type information of the data packet may include 2 bits, and is used to identify a type of a current data packet, where the current data packet may be of the type LLH 0, LLH 1, or LLH 2. The data packet of the type LLH 0 may include a plurality of flits (three flits are used as an example in FIG. 4, and are respectively a head flit, a data flit, and a tail flit). The head flit, the data flit, and the tail flit each carry a CRC, and each CRC may be a CRC_H, where the CRC_H represents a CRC in the head flit. Each flit is checked by using a CRC in the flit. The data packet of the type LLH 1 may include a plurality of flits (three flits are used as an example in FIG. 4, and are respectively a head flit, a data flit, and a tail flit). The head flit carries a CRC_H, the data flit does not carry a CRC, and the tail flit carries a CRC_T. The CRC_H and the CRC_T may be the same or different. The head flit is checked by using the CRC_H, the tail flit is checked by using the CRC_T, and the data flit is checked by using the CRC_H carried in the head flit. The data packet of the type LLH 2 may include a plurality of flits (three flits are used as an example in FIG. 4, and are respectively a head flit, a data flit, and a tail flit). The head flit carries a CRC_H, the data flit does not carry a CRC, and the tail flit carries an invariant CRC (ICRC). The CRC_H and the ICRC are usually different. The head flit is checked by using the CRC_H, the tail flit is checked by using the ICRC, and the data flit is checked by using the CRC_H carried in the head flit. Certainly, each flit of data packets of the foregoing three types may carry a payload (PLD), namely, data. In addition, the data packets of the foregoing three types may have a same CRC_H field segment location.

Currently, a data packet of a data type (or referred to as a type for short) at the link layer corresponds to a retransmission mechanism. When data packets of a plurality of data types exist at the link layer, a retransmission mechanism corresponding to any data type is difficult to meet a retransmission requirement.

Embodiments of this disclosure provide a method for retransmitting data and an apparatus. Data packets of different data types are identified at a link layer, differential processing is performed based on a retransmission mechanism (retransmission manner), and different retransmission mechanisms are adapted to the data packets of the different data types, so that the data packets of the plurality of data types at the link layer can be retransmitted.

Figure 5:
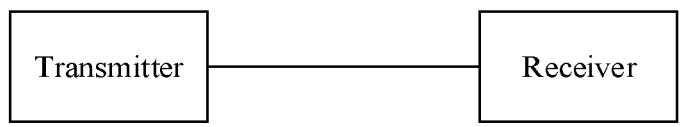
FIG. 5 is a schematic diagram of a system architecture according to an embodiment of this disclosure.

Embodiments of this disclosure provide a method for retransmitting data and an apparatus which are applied to a data transmission scenario at a data link layer (referred to as a link layer for short). FIG. 5 is a schematic diagram of a system architecture that is applicable to an embodiment of this disclosure and that includes a receiver and a transmitter. The receiver and the transmitter may be integrated on a same chip or an integrated circuit, or the receiver and the transmitter may be respectively located on different chips or integrated circuits. This is not limited in this disclosure.

There is a link between the transmitter and the receiver. The link may be an electrical link, or may be an optical link or a wireless link. The link is usually bidirectional or may be unidirectional. The link may be divided into a plurality of virtual channels/paths by dividing resources (such as time and/or a frequency) of the link into a plurality of slots (such as a timeslot and/or a frequency slot) for transmitting a flit.

The transmitter may be a resource node or a routing node. The receiver may be a resource node or a routing node. The resource node may be a processor or a device, and the device may be, for example, a graphics card, a memory, an input/output port, or any other electronic component. The processor may be a central processing unit, a general purpose processor, a network processor (NP), a digital signal processor (DSP), a microprocessor, a microcontroller, or a programmable logic device (PLD). The processor may be any other apparatus that has a processing function, for example, an application-specific integrated circuit (ASIC), a field-programmable gate array (FPGA) or another programmable logic device, a transistor logic device, a hardware component, a software module, or any combination thereof. The memory may be but is not limited to a read-only memory (ROM), another type of static storage device that can store static information and instructions, a random-access memory (RAM), another type of dynamic storage device that can store information and instructions, an electrically erasable programmable read-only memory (EEPROM), a disk storage medium, another magnetic storage device, or any other medium that can be configured to carry or store expected program code in a form of instructions or a data structure and that can be accessed by a computer.

The routing node may be any apparatus that can route a flit or a data packet. The routing node may perform flit routing in a manner in which the routing node receives a flit, determines, in a plurality of virtual channels, a channel on which a transmitted flit is located, and/or determines, in a plurality of routes, a route on which the transmitted flit is located. In a similar manner, the routing node may perform packet routing in a manner in which the routing node receives a packet, determines, in a plurality of virtual channels, a channel on which the transmitted packet is located, and/or determines, in a plurality of routes, a route on which the transmitted packet is located.

Figure 6:
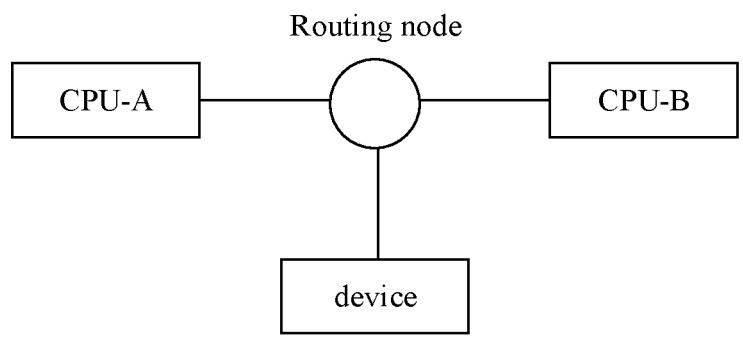
FIG. 6 is a schematic diagram of another system architecture according to an embodiment of this disclosure.

For example, as shown in FIG. 6, when the transmitter is a CPU-A, a CPU-B, or a device, the receiver may be a routing node. Alternatively, when the transmitter is a routing node, the receiver may be a CPU-A, a CPU-B, or a device.

The following describes technical solutions in embodiments of this disclosure with reference to the accompanying drawings in embodiments of this disclosure. In descriptions of this disclosure, unless otherwise stated, "at least one" refers to one or more, and "a plurality of" refers to two or more. In addition, to clearly describe the technical solutions in embodiments of this disclosure, words such as "first" and "second" are used in embodiments of this disclosure to distinguish between same items or similar items that have basically the same functions or purposes. A person skilled in the art may understand that the words such as "first" and "second" do not limit a quantity or an execution sequence, and the words such as "first" and "second" do not indicate a definite difference.

For ease of understanding, a method for retransmitting data in the embodiments of this disclosure is described below with reference to the accompanying drawings.

Figure 7:
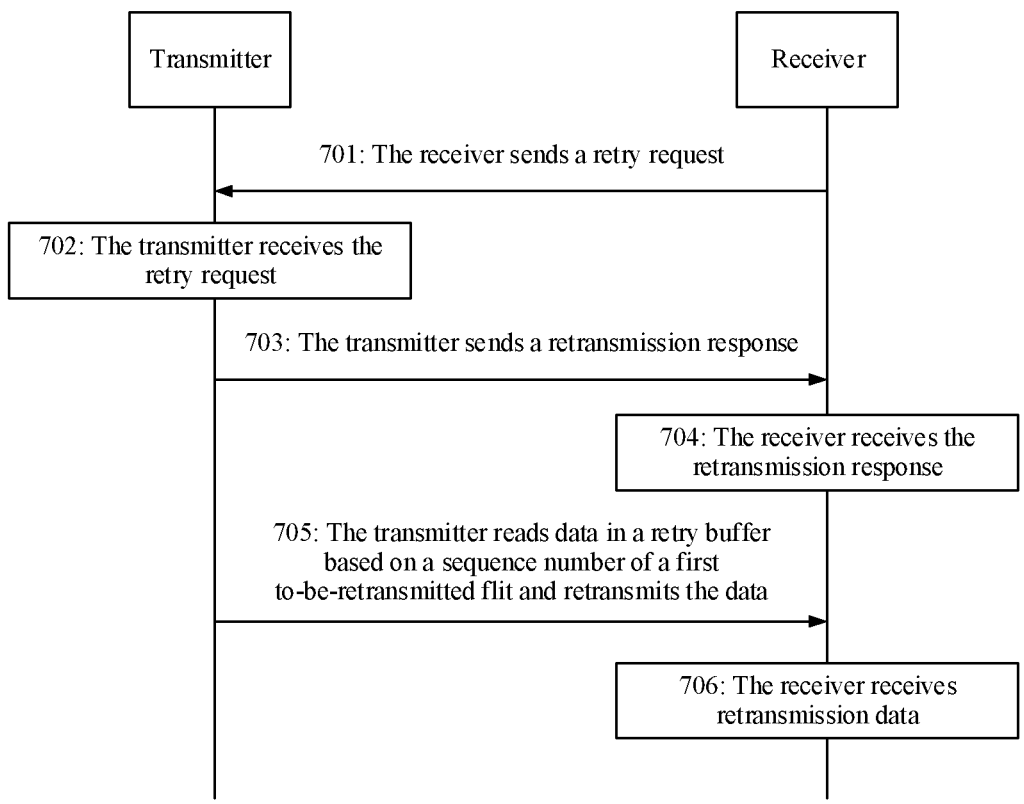
FIG. 7 is a schematic diagram of a signal interaction according to an embodiment of this disclosure.

As shown in FIG. 7, an embodiment of this disclosure provides a method for retransmitting data. The method includes the following processes.

701: A receiver sends a retry request.

The receiver may check a received flit. If the receiver fails to check a specific flit, the receiver may send the retry request to a transmitter. The retry request includes a sequence number (sequence number, seq_num) of a first to-be-retransmitted flit.

The retry request may include M consecutive LLR.reqs (one LLR.req may refer to one control flit). M is greater than a maximum transmission unit (MTU). The MTU may refer to a maximum quantity of flits that one data packet can be cut into, that is, a data packet can be cut into MTU flits at most. Each LLR.req may carry the sequence number of the first to-be-retransmitted flit.

702: The transmitter receives the retry request.

The transmitter receives the M consecutive LLR.reqs.

703: The transmitter sends a retransmission response.

After receiving the M consecutive LLR.reqs, the transmitter may send the retransmission response to the receiver. The retransmission response includes the sequence number of the first to-be-retransmitted flit (start_seq_num) and a sequence number of a last to-be-retransmitted flit (end_seq_num). The retransmission response may include M LLR.acks (one LLR.ack may refer to one control flit). Each LLR.ack may carry the start_seq_num and the end_seq_num.

If a flit that fails to be checked by the receiver is a flit of a first type (namely, LLH 0) of data packet, the first to-be-retransmitted flit is the flit that fails to be checked by the receiver; or if a flit that fails to be checked by the receiver is a flit of a second type (namely, LLH 1) or a third type (namely, LLH 2) of data packet, the first to-be-retransmitted flit is a head flit of a data packet to which the flit that fails to be checked by the receiver belongs.

If the last flit sent by the transmitter before the transmitter receives the retransmission response is the flit of the first type of data packet, the last to-be-retransmitted flit is the last flit sent before the retransmission response. If the last flit sent by the transmitter before the transmitter receives the retransmission response is the flit of the second type of data packet, the last to-be-retransmitted flit is a tail flit of a data packet to which the last flit sent before the retransmission response belongs. If the last flit sent by the transmitter before the transmitter receives the retransmission response is the flit of the third type of data packet, the last to-be-retransmitted flit is a head flit of a data packet to which the last flit sent before the retransmission response belongs.

704: The receiver receives the retransmission response.

When the receiver receives a first LLR.req, a timer may be started, and the receiver waits to receive the remaining M−1 LLR.reqs within duration of the timer. If the timer expires but the receiver does not receive (not receive all) M LLR.reqs, the receiver may resend the retry request, that is, step 701 is performed again.

705: The transmitter reads data in a retry buffer based on the sequence number of the first to-be-retransmitted flit and retransmits the data.

The transmitter may write, into the retry buffer, a data packet sent by the transmitter. The retry buffer includes flits of at least two types of data packets, that is, at least two types of data packets share the retry buffer, and retransmission manners of the at least two types of data packets are different.

In a possible design, the at least two types of data packets include at least two of the first type of data packet, the second type of data packet, and the third type of data packet. A head flit of each type of data packet carries indication information, and the indication information is used to indicate a type of the data packet. A retransmission manner of the first type of data packet is that the first type of data packet is retransmitted by using a flit as a granularity, a retransmission manner of the second type of data packet is that the second type of data packet is retransmitted by using a data packet as a granularity, and a retransmission manner of the third type of data packet is that the third type of data packet is not retransmitted.

If a sent data packet is of the first type or the second type, the transmitter may write all flits of the data packet into the retry buffer. If a sent data packet is of the third type, the transmitter may write the head flit of the data packet into the retry buffer. That is, the retry buffer may include all flits of the first type of data packet and all flits of the second type of data packet. Alternatively, the retry buffer may include all flits of the first type of data packet and the head flit of the third type of data packet. Alternatively, the retry buffer may include all flits of the second type of data packet and the head flit of the third type of data packet. Alternatively, the retry buffer may include all flits of the first type of data packet, all flits of the second type of data packet, and the head flit of the third type of data packet.

Because the first type or the second type of data packet needs to be retransmitted, all flits need to be written into the retry buffer. Because the third type of data packet does not need to be retransmitted, only the head flit may be written into the retry buffer, and then only the head flit may be retransmitted, so that the receiver maintains a sequence number of a to-be-retransmitted flit. After receiving the head flit of the second type of data packet, the receiver may discard the head flit.

706: The receiver receives retransmission data.

The receiver may determine the retransmission data (flit) based on the start_seq_num and the end_seq_num that are carried in the retransmission response, where the retransmission data includes all flits represented by the start_seq_num to the end_seq_num.

The retransmission data includes the flits of the at least two types of data packets. If the retransmission data includes the flit of the first type of data packet and/or the flit of the second type of data packet, the receiver buffers the flit of the first type of data packet and/or the flit of the second type of data packet; or if the retransmission data includes the head flit of the third type of data packet, the receiver discards the head flit of the third type of data packet.

The method for retransmitting data provided in this embodiment of this disclosure is described below with reference to different retry stages (retry stage) of the transmitter and the receiver.

Figure 8:
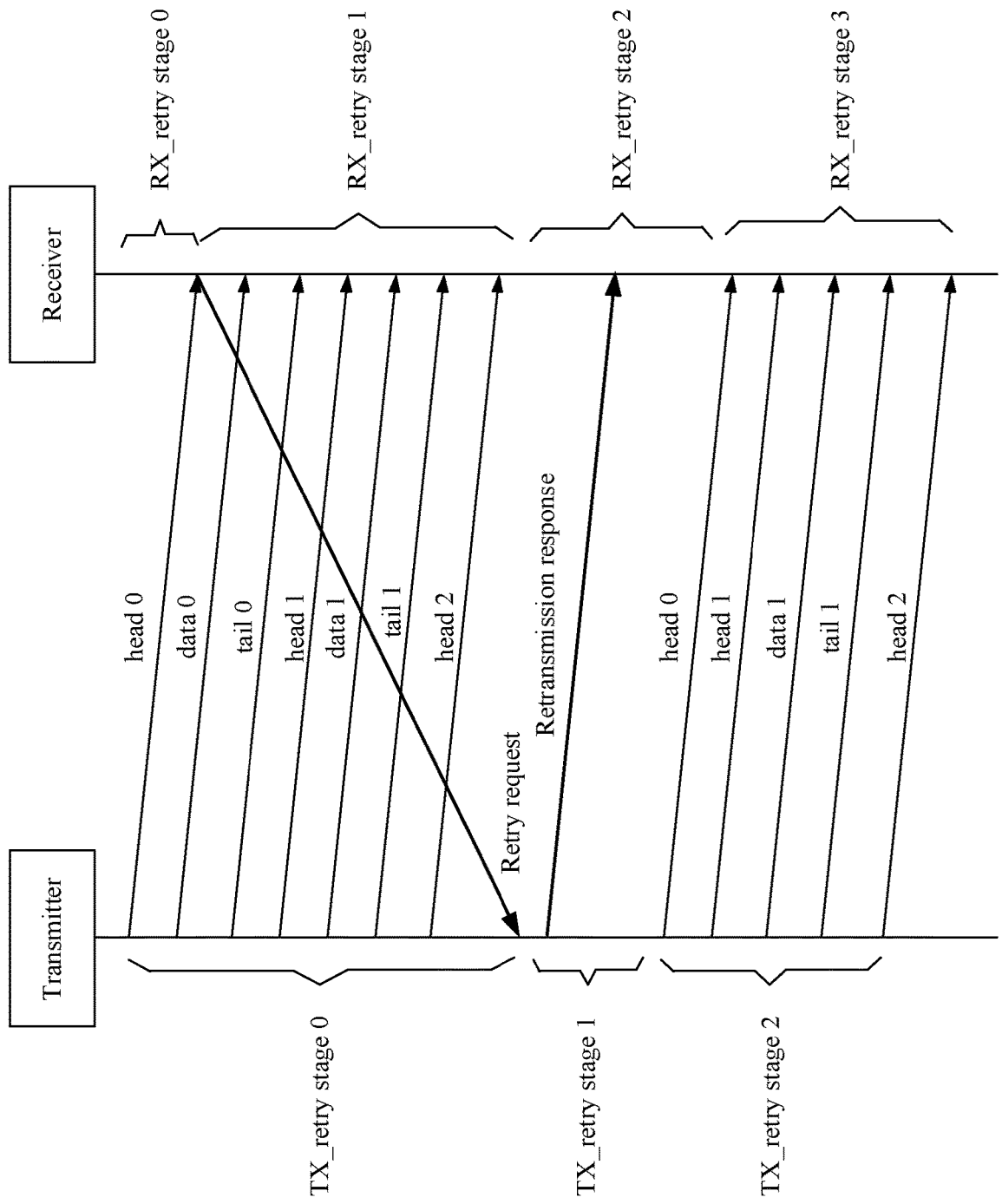
FIG. 8 is a schematic diagram of another signal interaction according to an embodiment of this disclosure.
Figure 9:
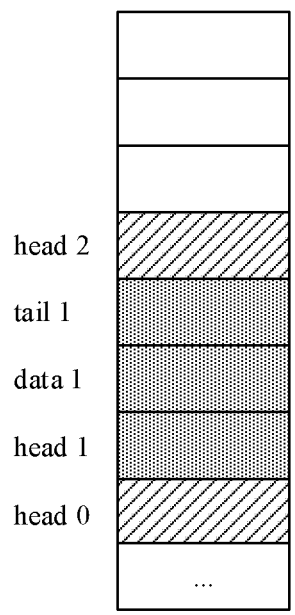
FIG. 9 is a schematic diagram of a retry buffer according to an embodiment of this disclosure.

As shown in FIG. 8, the transmitter may include the following three retry stages:

TX_retry stage 0: A stage of normally sending a message. For example, the transmitter may send a data packet 1 (including three flits: a head 0, data 0, and a tail 0), a data packet 2 (including three flits: a head 1, data 1, and a tail 1), and a part of a data packet 3 (including a head 2), and the remaining parts of the data packet 3 have not been sent. For a sent data packet, as shown in FIG. 9, assuming that the data packet 1 is of an LLH 2 type, a head flit (namely, the head 0) of the data packet 1 may be written into the retry buffer; assuming that the data packet 2 is of an LLH 0 type or an LLH 1 type, and all the flits (including three flits: the head 1, the data 1, and the tail 1) of the data packet 2 may be written into the retry buffer; and assuming that the data packet 3 is of the LLH 2 type, and a head flit (namely, the head 2) of the data packet 3 may be written into the retry buffer. Because the data packet of the type LLH 2 does not need to be retransmitted, only the head flit may be written into the retry buffer to save the buffer.

TX_retry stage 1: After receiving the retry request, the transmitter enters the stage 1 from the stage 0, and stops receiving an upstream message (namely, a data packet sent by another node to the transmitter). The retry request includes the start_seq_num.

TX_retry stage 2: After sending the retransmission response, the transmitter enters the stage 2 from the stage 1, reads data in the retry buffer based on the start_seq_num and then initiates retransmission. Then, the transmitter may enter the stage 0 from the stage 2, and normally send a message.

As shown in FIG. 8, the receiver may include the following four retry stages:

RX_retry stage 0: A stage of normally receiving a message. When receiving each flit of a data packet, the receiver may perform a CRC. For a flit that carries a CRC bit, a check is performed based on the CRC bit of the flit. For a flit (for example, a data flit of a data packet of the type LLH 1 or LLH 2) that does not carry a CRC bit, a check is performed based on a CRC bit of a head flit (the head flit of the data packet of the type LLH1 or LLH2). When the RX checks that a specific flit/pkt is correct, the RX may send a head flit of the correct data packet to the TX. The head flit may carry Ack information to confirm receipt of the flit/pkt. The TX can delete a corresponding flit/pkt in the retry buffer.

RX_retry stage 1: When a CRC error occurs, the receiver enters the stage 1 from the stage 0, and the receiver sends a retry request to the transmitter.

RX_retry stage 2: After the retry request is sent, the receiver enters the stage 2 from the stage 1. In this stage, the receiver receives a retransmission response.

RX_retry stage 3: After receiving the retransmission response, the receiver enters the stage 3 from the stage 2. The receiver receives data retransmitted by the transmitter, and performs a CRC check on the retransmission data. If a CRC error occurs, the receiver returns to the stage 1. If a result of the CRC is correct, different processing is performed based on the type of the data packet. If the head flit of the data packet of the type LLH 2 is received, the head flit is directly discarded. If a flit of the data packet of the type LLH 1 or LLH 0 is received, the receiver proceeds to lower stage processing (buffering and determining a next hop node). If the RX_seq_num (the sequence number of the to-be-retransmitted flit maintained by the RX) reaches the end_seq_num, the receiver returns to the stage 0, that is, after receiving all data retransmitted by the transmitter, the receiver may return to the stage 0 from the stage 3.

The method for retransmitting data provided in this embodiment of this disclosure is described below with reference to different scenarios.

Scenario 1: It is assumed that the transmitter sends a data packet of the type LLH 2 (denoted as a data packet 1) to the receiver from a first moment. When receiving the data packet 1, the receiver performs a CRC check on a head flit of the data packet 1 and obtains an error (failed). The receiver then sends a retry request to the transmitter, where the retry request carries a sequence number of the head flit of the data packet 1. The transmitter receives the retry request at a second moment. It is assumed that, from the first moment to the second moment, the transmitter sequentially sends a data packet of the type LLH 2 (namely, a data packet 1), a data packet of the type LLH 1 (denoted as a data packet 2), and another data packet of the type LLH 2 (denoted as a data packet 3) to the receiver. The transmitter determines that the data packet 1, the data packet 2 and the data packet 3 may need to be retransmitted. Because the data packet 1 is of the type LLH 2, the transmitter may retransmit only the head flit of the data packet 1. Because the data packet 2 is of the type LLH1, the transmitter retransmits all flits of the data packet 2. Because the data packet 3 is of the type LLH2, the transmitter may retransmit only the head flit of the data packet 1.

Scenario 2: It is assumed that the transmitter sends a data packet of the type LLH 0 (denoted as a data packet 1, and it is assumed that the data packet 1 includes three flits: a flit 1, a flit 2 and a flit 3) to the receiver from a first moment. The receiver receives each flit of the data packet 1. It is assumed that the receiver performs a CRC check on the flit 2 and obtains an error (failed). The receiver sends a retry request to the transmitter, where the retry request carries a sequence number of the flit 2 in the data packet 1. The transmitter receives the retry request at a second moment. It is assumed that, from the first moment to the second moment, the transmitter sequentially sends a data packet of the type LLH 0 (namely, a data packet 1), a data packet of the type LLH 1 (denoted as a data packet 2), and a data packet of the type LLH 2 (denoted as a data packet 3) to the receiver. The transmitter determines that the data packet 1, the data packet 2 and the data packet 3 may need to be retransmitted. Because the data packet 1 is of the type LLH 0, and a result of the CRC check of the flit 2 in the data packet 1 is an error but a CRC check of the flit 1 is normal, the transmitter may retransmit only the flit 2 and the flit 3 after the flit 2, and the flit 1 does not need to be retransmitted, that is, the (complete) data packet 1 does not need to be retransmitted. Because the data packet 2 is of the type LLH 1, the transmitter retransmits all flits of the data packet 2. Because the data packet 3 is of the type LLH 2, only the head flit is retransmitted.

Scenario 3: It is assumed that the transmitter sends a data packet of the type LLH 1 (denoted as a data packet 1, and it is assumed that the data packet 1 includes four flits: a flit 1, a flit 2, a flit 3 and a flit 4) to the receiver from a first moment. The receiver receives each flit of the data packet 1. It is assumed that the receiver performs a CRC check on the flit 4 and obtains an error (failed). The receiver sends a retry request to the transmitter, where the retry request carries a sequence number of the flit 4 in the data packet 1. The transmitter receives the retry request at a second moment. It is assumed that, from the first moment to the second moment, the transmitter sequentially sends a data packet of the type LLH 1 (namely, a data packet 1), a data packet of the type LLH 0 (denoted as a data packet 2), and a data packet of the type LLH 2 (denoted as a data packet 3) to the receiver. The transmitter determines that the data packet 1, the data packet 2 and the data packet 3 may need to be retransmitted. Because the data packet 1 is of the type LLH 1, although a result of the CRC check of the flit 4 in the data packet 1 is an error, the (complete) data packet 1 needs to be retransmitted even if the flit 1 to flit 3 are normal. Because the data packet 2 is of the type LLH 0 and all flits of the data packet 2 are discarded by the receiver, the transmitter retransmits (all the flits of) the data packet 2. Because the data packet 3 is of the type LLH 2, only the head flit is retransmitted.

Based on the method provided in this embodiment of this disclosure, after receiving the retry request, the transmitter may read data in the retry buffer based on the sequence number of the first to-be-retransmitted flit carried in the retry request, and retransmit the data. The receiver receives retransmission data retransmitted by the transmitter. The retry buffer includes flits of at least two types of data packets, and retransmission manners of the at least two types of data packets are different. In this way, when a link layer includes at least two types of data packets, the at least two types of data packets may share a retry buffer, and corresponding data may be retransmitted in different retransmission manners, that is, a function of supporting a plurality of retransmission mechanisms (retransmission manners) at the link layer can be implemented. Therefore, data packets of different data types at the link layer can be retransmitted.

In the foregoing embodiment provided in this disclosure, the method provided in this embodiment of this disclosure is separately described from perspectives of the transmitter, the receiver, and interaction between the transmitter and the receiver. To implement functions of the method provided in the foregoing embodiment of this disclosure, the transmitter and the receiver may include hardware structures and/or software modules, to implement the functions in a form of a hardware structure, a software module, or a hardware structure plus a software module. Whether one of the foregoing functions is performed in the manner of a hardware structure, a software module, or a hardware structure and a software module depends on a specific application and design constraints of the technical solutions.

Figure 10:
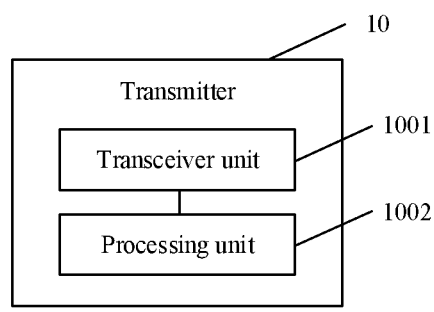
FIG. 10 is a schematic diagram of a structure of a transmitter according to an embodiment of this disclosure.

When functional modules are classified based on corresponding functions, FIG. 10 shows a schematic diagram of a possible structure of the transmitter 10 in the foregoing embodiment. The transmitter 10 includes a transceiver unit 1001 and a processing unit 1002. In this embodiment of this disclosure, the transceiver unit 1001 is configured to receive a retry request, where the retry request includes a sequence number of the first to-be-retransmitted flit. The processing unit 1002 is configured to read data in a retry buffer based on the sequence number of the first to-be-retransmitted flit, and retransmit the data by using the transceiver unit 1001, where the retry buffer includes flits of at least two types of data packets, and retransmission manners of the at least two types of data packets are different.

In the method embodiment shown in FIG. 7, the transceiver unit 1001 is configured to support the transmitter to perform processes 702, 703, and 705 in FIG. 7. The processing unit 1002 is configured to support the transmitter to perform the process 705 in FIG. 7. All related content of the steps in the method embodiments may be cited in function descriptions of corresponding functional modules. Details are not described herein again.

Figure 11:
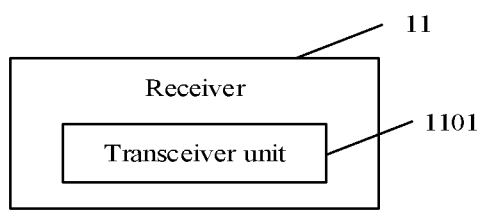
FIG. 11 is a schematic diagram of a structure of a receiver according to an embodiment of this disclosure.

When functional modules are classified based on corresponding functions, FIG. 11 shows a schematic diagram of a possible structure of the receiver 11 in the foregoing embodiment. The receiver 11 includes a transceiver unit 1101. In this embodiment of this disclosure, the transceiver unit 1101 is configured to send a retry request, where the retry request includes a sequence number of a first to-be-retransmitted flit. The transceiver unit 1101 is further configured to receive retransmission data, where the retransmission data includes flits of at least two types of data packets, and retransmission manners of the at least two types of data packets are different.

In the method embodiment shown in FIG. 7, the transceiver unit 1101 is configured to support the receiver to perform processes 701, 704, and 706 in FIG. 7. All related content of the steps in the method embodiments may be cited in function descriptions of corresponding functional modules. Details are not described herein again.

Figure 12:
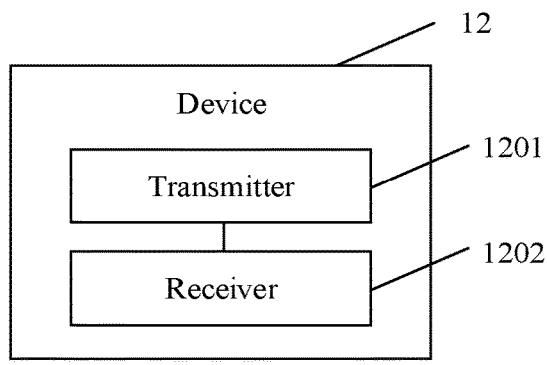
FIG. 12 is a schematic diagram of a structure of a device according to an embodiment of this disclosure.

When functional modules are classified based on corresponding functions, FIG. 12 shows a schematic diagram of a structure of a device 12. The device 12 includes a transmitter 1201 and a receiver 1202. In this embodiment of this disclosure, the receiver 1202 is configured to send a retry request, where the retry request includes a sequence number of a first to-be-retransmitted flit. The transmitter 1201 is configured to receive the retry request. The transmitter 1201 is further configured to read data in a retry buffer based on the sequence number of the first to-be-retransmitted flit, and retransmit the data, where the retry buffer includes flits of at least two types of data packets, and retransmission manners of the at least two types of data packets are different. The receiver 1202 is further configured to receive retransmission data, where the retransmission data includes flits of at least two types of data packets, and retransmission manners of the at least two types of data packets are different.

All related content of the steps in the method embodiments may be cited in function descriptions of corresponding functional modules. Details are not described herein again.

Figure 13:
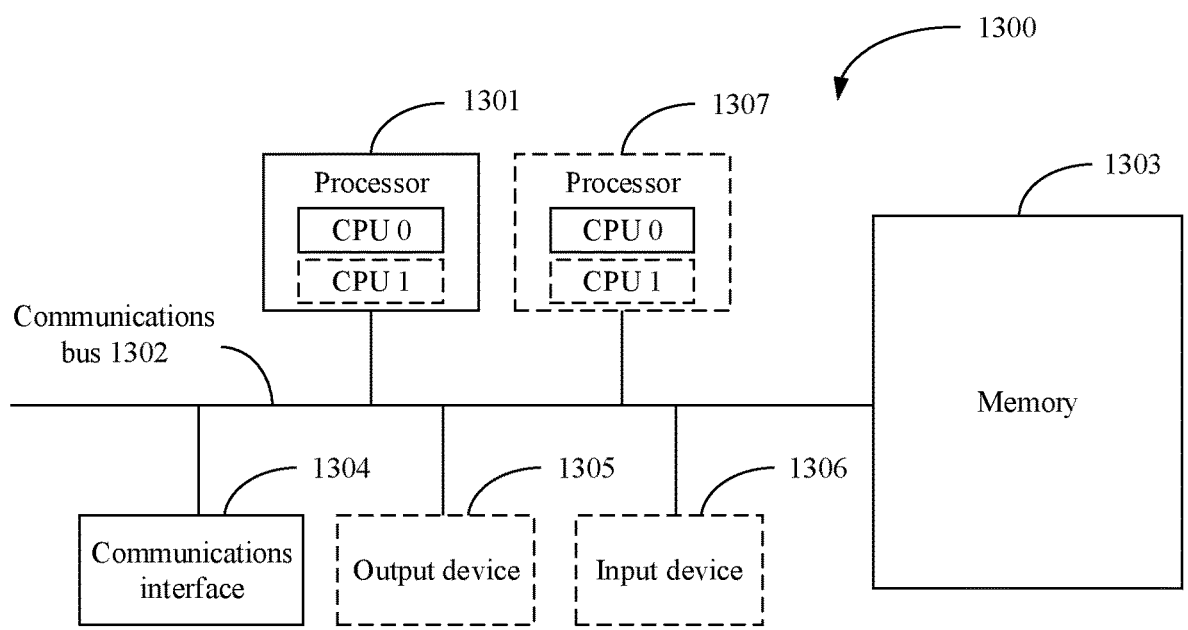
FIG. 13 is a schematic diagram of a structure of another device according to an embodiment of this disclosure.

In a possible design, the device 12 may be implemented by using a device (or system) in FIG. 13.

FIG. 13 is a schematic diagram of a device according to an embodiment of this disclosure. The device 1300 includes at least one processor 1301, a communications bus 1302, a memory 1303, and at least one communications interface 1304.

The processor 1301 may be a general purpose CPU, a microprocessor, an ASIC, or one or more integrated circuits configured to control program execution of the solution in this disclosure.

The communications bus 1302 may include a channel for transmitting information between the foregoing components.

The communications interface 1304 is configured to communicate with another device or a communications network, for example, an Ethernet, a radio access network (RAN), or a wireless local area network (WLAN).

The memory 1303 may be but is not limited to a ROM, another type of static storage device that can store static information and instructions, a RAM, another type of dynamic storage device that can store information and instructions, an EEPROM, a compact disc read-only memory (CD-ROM), another optical disc storage, an optical disc storage (including a compressed optical disc, a laser disc, an optical disc, a digital versatile optical disc, a BLU-RAY disc, or the like), a magnetic disk storage medium, another magnetic storage device, or any other medium that can be configured to carry or store expected program code in a form of instructions or a data structure and that can be accessed by a device, but this is not limited thereto. The memory may exist independently, and is connected to the processor by using the bus. Alternatively, the memory may be integrated with the processor.

The memory 1303 is configured to store application program code for executing the solution in this disclosure, and the application program code is controlled and executed by the processor 1301. The processor 1301 is configured to execute the application program code stored in the memory 1303, to implement the functions in the method in this disclosure.

During specific implementation, in an embodiment, the processor 1301 may include one or more CPUs such as a CPU 0 and a CPU 1 in FIG. 13.

In a specific implementation, as an embodiment, the device 1300 may include a plurality of processors, for example, the processor 1301 and a processor 1307 in FIG. 13. Each of the processors may be a single-core (single-CPU) processor or a multi-core (multi-CPU) processor. The processor herein may refer to one or more devices, circuits, and/or processing cores configured to process data (for example, program instructions of a computing device).

In specific implementation, as an embodiment, the device 1300 may further include an output device 1305 and an input device 1306. The output device 1305 communicates with the processor 1301, and may display information in a plurality of manners. For example, the output device 1305 may be a liquid-crystal display (LCD), a light-emitting diode (LED) display device, a cathode-ray tube (CRT) display device, or a projector. The input device 1306 communicates with the processor 1301, and may receive a user input in a plurality of manners. For example, the input device 1306 may be a mouse, a keyboard, a touchscreen device, a sensing device, or a monitored device.

The device 1300 may be a general computing device or a dedicated computing device. In specific implementation, the device 1300 may be a desktop computer, a portable computer, a network server, a personal digital assistant (PDA), a mobile phone, a tablet, a wireless terminal device, a communications device, an embedded device, or a device having a similar structure in FIG. 13. A type of the device 1300 is not limited in this embodiment of this disclosure.

Method or algorithm steps described in combination with the content disclosed in this disclosure may be implemented by hardware, or may be implemented by a processor by executing software instructions. The software instructions may include a corresponding software module. The software module may be placed in a RAM, a flash memory, a ROM, an erasable programmable read-only memory (EPROM), an EEPROM, a register, a hard disk, a removable hard disk, a read-only optical disc, or any other form of storage medium well-known in the art. For example, a storage medium is coupled to a processor, so that the processor can read information from the storage medium or write information into the storage medium. Certainly, the storage medium may be a component of the processor. The processor and the storage medium may be disposed in an ASIC. In addition, the ASIC may be located in a core network interface device. Certainly, the processor and the storage medium may exist in the core network interface device as discrete components.

A person skilled in the art should be aware that in the foregoing one or more examples, functions described in this disclosure may be implemented by hardware, software, firmware, or any combination thereof. When the functions are implemented by software, the foregoing functions may be stored in a computing-device-readable medium or transmitted as one or more instructions or code in a computing-device-readable medium. The computing-device-readable medium includes a computing device storage medium and a communication medium. The communication medium includes any medium that facilitates transmission of a computing device program from one place to another. The storage medium may be any available medium accessible to a general-purpose or a special-purpose computing device.

In the foregoing specific implementations, the objectives, technical solutions, and beneficial effects of this disclosure are further described in detail. It should be understood that the foregoing descriptions are merely specific implementations of this disclosure, but are not intended to limit the protection scope of this disclosure. Any modification, equivalent replacement, improvement, or the like made based on the technical solutions of this disclosure shall fall within the protection scope of this disclosure.

What is claimed is:

1. A method for retransmitting data implemented by a transmitter, wherein the method comprises:
  receiving a retry request, wherein the retry request comprises a first sequence number of a first to-be-retransmitted flit;
  reading, based on the first sequence number, data in a retry buffer, wherein the retry buffer comprises flits of at least two types of data packets, wherein retransmission manners of the at least two types are different, wherein a head flit of each type of data packet in the at least two types carries indication information, and wherein the indication information indicates a type of the data packet; and
  retransmitting, based on the type of the data packet, the data.

2. The method of claim 1, wherein the at least two types comprise at least two of a first type of data packet, a second type of data packet, or a third type of data packet, wherein a first retransmission manner of the first type is that the first type is retransmitted by using a first flit as a granularity, wherein a second retransmission manner of the second type is that the second type is retransmitted by using a first data packet as the granularity, and wherein a third retransmission manner of the third type is that the third type is not retransmitted.

3. The method of claim 2, wherein the retry buffer comprises all first flits of the first type, all second flits of the second type, and a head flit of the third type, wherein the retry buffer comprises all first flits and all second flits, wherein the retry buffer comprises all first flits and the head flit, or wherein the retry buffer comprises all second flits and the head flit.

4. The method of claim 2, wherein when a second flit that fails to be checked is of the first type, the first to-be-retransmitted flit is the second flit, and wherein when a third flit that fails to be checked is of the second type or of the third type, the first to-be-retransmitted flit is a head flit of a second data packet to which the third flit belongs.

5. The method of claim 1, further comprising sending a retransmission response, wherein the retransmission response comprises the first sequence number and a second sequence number of a last to-be-retransmitted flit.

6. The method of claim 5, wherein when a first last flit sent by the transmitter before the transmitter receives the retransmission response is a first flit of a first type of data packet, the last to-be-retransmitted flit is the first last flit, wherein when a second last flit sent by the transmitter before the transmitter receives the retransmission response is a second flit of a second type of data packet, the last to-be-retransmitted flit is a tail flit of a second data packet to which the second flit belongs, or wherein when a third last flit sent by the transmitter before the transmitter receives the retransmission response is a third flit of a third type of data packet, the last to-be-retransmitted flit is a head flit of a third data packet to which the third last flit belongs.

7. The method of claim 1, wherein retransmitting, based on the type of the data packet, the data comprises:
  retransmitting, using a first flit as a granularity, the data when a flit is a retransmission unit; and
  retransmitting, using a first packet as the granularity, the data when a packet is the retransmission unit.

8. A transmitter, comprising:
  a memory configured to store instructions; and
  one or more processors coupled to the memory and configured to execute the instructions to:
    receive a retry request, wherein the retry request comprises a first sequence number of a first to-be-retransmitted flit;
    read, based on the first sequence number, data in a retry buffer, wherein the retry buffer comprises flits of at least two types of data packets, wherein retransmission manners of the at least two types are different, wherein a head flit of each type of data packet in the at least two types carries indication information, and wherein the indication information indicates a type of the data packet; and
    retransmit, based on the type of the data packet, the data.

9. The transmitter of claim 8, wherein the at least two types comprise at least two of a first type of data packet, a second type of data packet, or a third type of data packet, wherein a first retransmission manner of the first type is that the first type is retransmitted by using a first flit as a granularity, wherein a second retransmission manner of the second type of data packet is that the second type is retransmitted by using a first data packet as the granularity, and wherein a third retransmission manner of the third type is that the third type is not retransmitted.

10. The transmitter of claim 9, wherein the retry buffer comprises all first flits of the first type, all second flits of the second type, and a head flit of the third type, wherein the retry buffer comprises all first flits and all second flits, wherein the retry buffer comprises all first flits and the head flit, or wherein the retry buffer comprises all second flits and the head flit.

11. The transmitter of claim 9, wherein when a second flit that fails to be checked is the first type, the first to-be-retransmitted flit is the second flit, or wherein when a third flit that fails to be checked is of the second type or a fourth flit of the third type, the first to-be-retransmitted flit is a head flit of a second data packet to which the third flit belongs.

12. The transmitter of claim 8, wherein the one or more processors are processor is further configured to execute the instructions to send a retransmission response, and wherein the retransmission response comprises the first sequence number and a second sequence number of a last to-be-retransmitted flit.

13. The transmitter of claim 12, wherein when a first last flit sent by the transmitter before the transmitter receives the retransmission response is a first flit of a first type of data packet, the last to-be-retransmitted flit is the first last flit, wherein when a second last flit sent by the transmitter before the transmitter receives the retransmission response is a second flit of a second type of data packet, the last to-be-retransmitted flit is a tail flit of a first data packet to which the second last flit belongs, or wherein when a third last flit sent by the transmitter before the transmitter receives the retransmission response is a third flit of a third type of data packet, the last to-be-retransmitted flit is a head flit of a second data packet to which the third last flit belongs.

14. The transmitter of claim 8, wherein the one or more processors are further configured to execute the instructions to retransmit, based on the type of the data packet, the data by:
  retransmit, using a first flit as a granularity, the data when a flit is a retransmission unit; and
  retransmit, using a first packet as the granularity, the data when a packet is the retransmission unit.

15. A computer program product comprising instructions stored on a non-transitory computer-readable medium that, when executed by one or more processors, cause an electronic device to:
  receive a retry request, wherein the retry request comprises a first sequence number of a first to-be-retransmitted flit;
  read, based on the first sequence number, data in a retry buffer, wherein the retry buffer comprises flits of at least two types, wherein retransmission manners of the at least two types of data packets are different, wherein a head flit of each type of data packet in the at least two types carries indication information, and wherein the indication information indicates a type of the data packet; and
  retransmit, based on the type of the data packet, the data.

16. The computer program product of claim 15, wherein the at least two types comprise at least two of a first type of data packet, a second type of data packet, or a third type of data packet, wherein a first retransmission manner of the first type is that the first type is retransmitted by using a first flit as a granularity, wherein a second retransmission manner of the second type is that the second type is retransmitted by using a first data packet as the granularity, and wherein a third retransmission manner of the third type is that the third type is not retransmitted.

17. The computer program product of claim 16, wherein the retry buffer comprises all first flits of the first type, all second flits of the second type, and a head flit of the third type, wherein the retry buffer comprises all first flits and all second flits, wherein the retry buffer comprises all first flits and the head flit, or wherein the retry buffer comprises all second flits and the head flit.

18. The computer program product of claim 16, wherein when a second flit that fails to be checked is of the first type, the first to-be-retransmitted flit is the second flit, and wherein when a third flit that fails to be checked is of the second type or of the third type, the first to-be-retransmitted flit is a head flit of a second data packet to which the third flit belongs.

19. The computer program product of claim 15, wherein the one or more processors are further configured to execute the instructions to send a retransmission response, and wherein the retransmission response comprises the first sequence number and a second sequence number of a last to-be-retransmitted flit.

20. The computer program product of claim 15, wherein the one or more processors are further configured to execute the instructions to cause the electronic device to retransmit, based on the type of the data packet, the data by:
   retransmitting, using a first flit as a granularity, the data when a flit is a retransmission unit; and
   retransmitting, using a first packet as the granularity, the data when a packet is the retransmission unit.

\* \* \* \* \*